(12) United States Patent
Navarra Pruna

(10) Patent No.: US 12,377,591 B2
(45) Date of Patent: Aug. 5, 2025

(54) SAFETY DEVICE FOR INJECTION MOLDS

(71) Applicant: COMERCIAL DE UTILES Y MOLDES, S.A., Sant Just Desvern (ES)

(72) Inventor: Alberto Navarra Pruna, Sant Just Desvern (ES)

(73) Assignee: COMERCIAL DE UTILES Y MOLDES, S.A., Sant Just Desvern (ES)

( * ) Notice: Subject to any disclaimer, the term of this patent is extended or adjusted under 35 U.S.C. 154(b) by 128 days.

(21) Appl. No.: 18/309,436

(22) Filed: Apr. 28, 2023

(65) Prior Publication Data
US 2023/0347566 A1    Nov. 2, 2023

(30) Foreign Application Priority Data

Apr. 29, 2022   (ES) .................................. P202230391

(51) Int. Cl.
| | |
|---|---|
| *B29C 45/64* | (2006.01) |
| *B29C 45/17* | (2006.01) |
| *B29C 45/66* | (2006.01) |
| *B29C 45/84* | (2006.01) |
| *B29C 31/00* | (2006.01) |

(52) U.S. Cl.
CPC .............. *B29C 45/84* (2013.01); *B29C 45/17* (2013.01); *B29C 45/1742* (2013.01); *B29C 45/1775* (2013.01); *B29C 45/641* (2013.01); *B29C 45/66* (2013.01); *B29C 31/006* (2013.01)

(58) Field of Classification Search
CPC ... B29C 45/1775; B29C 45/641; B29C 45/66; B29C 45/84
See application file for complete search history.

(56) References Cited

U.S. PATENT DOCUMENTS

| | | | | |
|---|---|---|---|---|
| 4,372,738 | A * | 2/1983 | Black .................... | B29C 45/641 249/166 |
| 6,589,044 | B2 * | 7/2003 | Navarra-Pruna ..... | B29C 45/332 425/441 |
| 9,017,062 | B2 * | 4/2015 | Navarra Pruna ....... | B29C 45/72 425/547 |
| 10,894,347 | B2 * | 1/2021 | Navarra Pruna ....... | B29C 33/46 |
| 12,090,548 | B2 * | 9/2024 | Whealy .................. | B22D 17/32 |

(Continued)

FOREIGN PATENT DOCUMENTS

| | | |
|---|---|---|
| CN | 2710874 | 7/2005 |
| CN | 105150478 A | 12/2015 |
| CN | 107901335 A | 4/2018 |

(Continued)

*Primary Examiner* — Atul P. Khare

(57) ABSTRACT

The safety device for injection molds comprises: a plate (1) attachable to a fixed part of a mold; a base (4) attachable to a movable part of a mold; wherein the base (4) comprises a safety shaft (10) movable between an unmounted position, wherein said safety shaft (10) is housed in a bore (13) of the plate (1), preventing displacement between the plate (1) and the base (4), and an assembled position, in which said safety shaft (10) is located outside the hole (13) of the plate (1), the displacement of the safety shaft (10) being driven by an actuator (7), allowing displacement between the plate (1) and the base (4). It ensures the connection of the two parts of the mold when the mold is not mounted on the injection molding machine.

8 Claims, 2 Drawing Sheets

(56) References Cited

U.S. PATENT DOCUMENTS

2003/0201576 A1* 10/2003 Smith ................. B29C 45/2606
425/169
2019/0151939 A1* 5/2019 Benck .................... B22D 17/32

FOREIGN PATENT DOCUMENTS

| CN | 110293651 | A |   | 10/2019 |              |
|----|-----------|---|---|---------|--------------|
| CN | 112743770 | A | * | 5/2021  | ............. B29C 33/76 |
| CN | 113059753 | A | * | 7/2021  | ........... B29C 45/641 |
| CN | 114161655 | A | * | 3/2022  | ....... B29C 45/14819 |
| DE | 1958612   | U | * | 4/1967  | ........... B29C 45/641 |
| DE | 19757387  | A1 | * | 6/1999 | ........ B29C 45/0017 |
| JP | H0716880  | A | * | 1/1993  | ............. B29C 45/17 |
| JP | 2816894   | B2 | * | 10/1998 | ............. B29C 33/30 |

* cited by examiner

SAFETY DEVICE FOR INJECTION MOLDS

OBJECT OF THE INVENTION

The present invention relates to a safety device for injection molds, which ensures that the movable part of the mold does not separate from the fixed part of the mold when it is not mounted on the injection molding machine.

BACKGROUND OF THE INVENTION

In industry in general, it is very common to use an injection molding system for the manufacture of different components, as it has been proven to be the most economical system for the mass production of multiple articles.

Although in industry in general perhaps the most massive use is the injection of thermoplastics, we should not rule out the injection of non-ferrous materials, such as aluminum, thermosetting materials, etc., and in all cases the use of molds is essential.

The molds are usually made of steel and comprise a minimum of two plates machined in such a way that, when joined together, they form a cavity which can be filled with any type of molten material and which, when solidified, becomes an article which faithfully represents the machining carried out. In all cases, the product itself is a faithful inverted reflection of the hollow.

This simple description is to understand that all molds comprise a minimum of two halves. Logically, industrial molds are much more complex, as they incorporate a series of elements to be able to treat them industrially and achieve mass production of the products in question.

For serial production, the molds are mounted on suitable machines that carry out all the movements necessary for manufacturing. To achieve this system of serial production, complex machines are required that have a feed of the material to be injected, as well as the movable mechanical elements that allow the mold to be incorporated into the machine, which is of a very wide range and adapts to the diversity of mold sizes.

Molds can weigh from 10 kg to more than 25 tons, and usually require complex means for their handling, since they must be transported by special elements or with cranes for their usual handling, whether it is for transfers between workshop premises, warehouse, injection plant, transfers outside the factory, or the shipments themselves from the industry that has manufactured the mold to the injection molding company.

When moving the molds, it is essential to ensure that the two halves of the mold always form a single unit and do not accidentally separate. For this purpose, it is usual to connect the two halves with one or more safety flanges that are fastened with screws, so that the two halves are firmly joined together, avoiding unexpected separations, since, in the case of considerable weights, the possibilities of accidental accidents could be serious.

For the placement of the mold in the machine, this risk of separation also exists, and it is accentuated, as the machines have a certain height and the molds are usually mounted above the machine itself, so it is common for the displacement of these weights to be carried out at a height of more than 3 meters. It is for this reason that the safety flanges fulfil an important mission, which is safety in handling.

Furthermore, in the process of assembling molds on injection molding machines, there are significant risks of accidents. Make sure that the mold is kept closed before finishing the assembly on the machine and between the two parts where it will be fastened, as it could open during this process and cause damage to the operators or to the machine itself.

Once the mold is centered in its proper location in the machine, the clamping of the mold to the machine is another operation that requires special attention, as a mold that is not properly clamped in the machine can cause great damage, but it is also very important not to forget to completely dismantle the safety flanges, because if we activate the movements of the machine and a flange has not been dismounted properly, the hydraulic force exerted by the separation of the mold can cause major damage and even breakage of the clamping screws and the fall of part of the mold with the consequences that this can cause.

When removing the mold from the machine, both parts of the mold must also be properly secured, because if the mold is not properly clamped, the movements during dismantling can also have serious consequences, such as possible accidents to the operators. To prevent this from happening, it is very important that both the assembly and disassembly of the mold on the machine is carried out by highly qualified personnel, who ensure that the mold is perfectly clamped between the two parts of the mold.

However, this manual action by operators is error-prone and requires considerable time and manpower.

DESCRIPTION OF THE INVENTION

Therefore, the aim of the present invention is to provide a safety device for injection molds which allows to ensure the joining of the two parts of the mold when the mold is not mounted on the injection molding machine, ensuring that, at the instant of mounting the mold on the machine, it allows the opening with the movements of the machine, but when the mold is dismounted from the machine it ensures the joining of the two parts of the mold automatically.

The safety device for injection molds according to the present invention is described in claim 1. Additional features of the safety device are described in the dependent claims.

In particular, the safety device for injection molds comprises:
a plate that can be attached to a fixed part of a mold;
a base that can be attached to a movable part of a mold;
wherein the base comprises a safety shaft movable between:
   a disassembled position, in which the safety shaft is housed in a hole in the plate, preventing displacement between the plate and the base, and
   an assembled position, in which the safety shaft is located outside the bore of the plate, the movement of the safety shaft being actuated by an actuator, allowing movement between the plate and the base.

Advantageously, such an actuator is arranged at one end of a drive shaft fitted with a spring, which pushes the drive shaft to move the safety shaft into the dismounted position, and so that, as the actuator moves the safety shaft into the mounted position, it does so against the action of the spring.

Thus, when the safety shaft is in the mounted position, i.e., when the mold is mounted on an injection molding machine, the mold can be opened and closed, whereas when it is in the dismounted position, i.e. when the mold is not mounted on an injection molding machine, the mold will remain closed, as the base plate and base will not be able to move against each other.

In addition, the drive shaft comprises a rod, which can be cut to the desired length so that the drive shaft has the required length depending on the dimensions of the mold.

In a preferred embodiment, the drive shaft comprises teeth that engage with complementary teeth of the safety shaft, such that displacement of the drive shaft causes displacement of the safety shaft.

Preferably, to ensure correct positioning, the plate comprises a centering sleeve.

DESCRIPTION OF THE DRAWINGS

In order to complement the description being made and in order to assist in a better understanding of the features of the invention, in accordance with a preferred example of a practical embodiment thereof, a set of drawings is attached hereto as an integral part of the said description, in which the following is illustratively and non-limitingly depicted.

PREFERRED EMBODIMENT OF THE INVENTION

Figure 1:
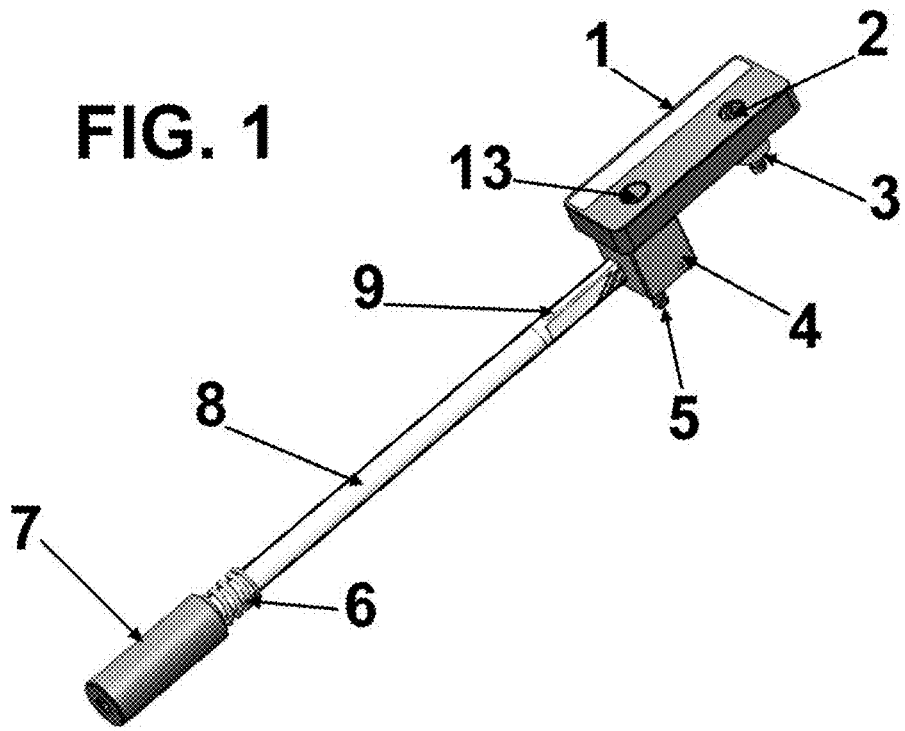
FIG. 1 is a top perspective view of the safety device for injection molds according to the present invention.
Figure 2:
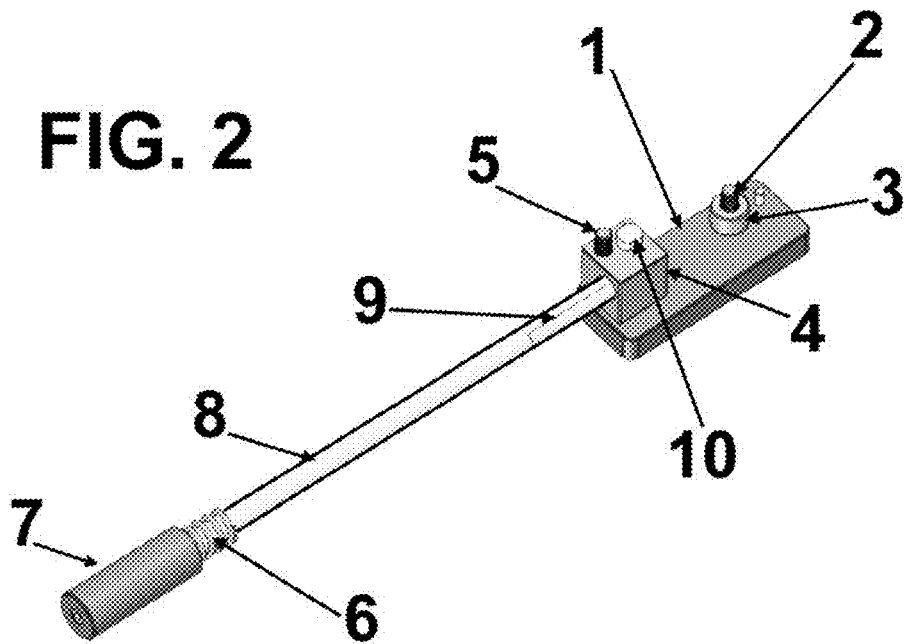
FIG. 2 is a bottom perspective view of the safety device for injection molds according to the present invention.

As previously indicated, injection molds are made up of two parts, a fixed part, and a movable part, which allow them to be separated in order to obtain pieces during the injection molding process.

During the manufacturing process, these two parts are connected to an injection molding machine that allows the opening and closing of the molds in each injection cycle to obtain the manufactured piece, but when the molds are not mounted on the injection molding machines, it is essential to ensure that the two parts do not separate, as there could be a significant risk of an accident.

In order to ensure this condition, the safety device according to the present invention has been designed, which makes it possible to secure the joining of the two parts of the mold when it is not mounted on the injection molding machine.

This safety device ensures that when the mold is mounted on the machine, it allows the mold to open with the movements of the machine, but when the mold is not mounted on the machine, it ensures the joining of the two parts of the mold automatically.

In particular, the safety device according to the present invention comprises a plate (1) which is attached to the fixed part (11) of the mold, for example, by means of a screw (2). This plate (1) comprises a hole (13) for a safety shaft (10).

In order to position the plate (1) perfectly in relation to the fixed part (11), the plate (1) comprises a centering sleeve (3) which is recessed into the plate (1).

The safety device according to the present invention also comprises a base (4) attached to the movable part (12), for example, by means of a screw (5). Said base (4) comprises holes for housing the safety shaft (10) mentioned above and for housing a drive shaft (9).

The safety shaft (10) can be placed in two positions: an assembled position, in which the safety shaft (10) is housed in the bores of the plate (1), and a disassembled position, in which the safety shaft (10) is outside the bore of the plate (1).

In the assembled position, the mold is mounted on an injection machine, allowing the mold to be opened and closed, i.e., the movable part (12) of the mold to move relative to the fixed part (11), and in the disassembled position, the mold is not mounted on an injection machine, the mold being closed, preventing the movable part (12) from moving relative to the fixed part (11).

The drive shaft (9) is fitted with a rod (8), the length of which can be adapted to suit different mold widths by cutting the rod (8) to the required length. At the end of the rod (8) furthest from the base (4) there is a spring (6) and an actuator (7).

The mounting of the safety device according to the present invention on the mold is as follows. The mold has two parts which are separated from each other, the fixed part (11) and the movable part (12).

On the fixed part (11) of the mold is fixed the plate (1), while on the movable part (12) of the mold is installed the rest of the components of the device according to the present invention, i.e., the base (4), the drive shaft (9), the rod (8), the safety shaft (10), the spring (6) and the actuator (7).

When the mold is outside an injection molding machine, the device remains closed. This is achieved because the spring (6) pushes the drive shaft (9) and the rod (8) out of the mold, so that the safety shaft (10) is in the dismounted position, in which the safety shaft (10) is inserted into its hole (13) in the plate (1), thus making it impossible for the two parts (11, 12) of the mold to separate.

The movement between the drive shaft (9) and the safety shaft (10) is achieved, for example, by means of a gear system with inclined teeth which allow the safety shaft (10) to move perpendicularly to the drive shaft (9) when it is moved by the actuator (7) and the spring (6).

When the mold is mounted on the injection molding machine, the fixed part (11) of the mold is the first to be fixed to the machine, and the safety device according to the present invention ensures that the mold remains closed until the movable part (12) of the mold is fixed, as the safety shaft (10) remains inside the hole (13) of the plate (1).

When the moving part (12) of the mold is fixed to the injection molding machine, the actuator (7) moves the rod (8) and the drive shaft (9) to move the safety shaft (10) out of its hole (13) in the plate (1). In this way, when you want to open the mold by actuating the movements of the injection molding machine, the mold will open without difficulty.

Figure 3:
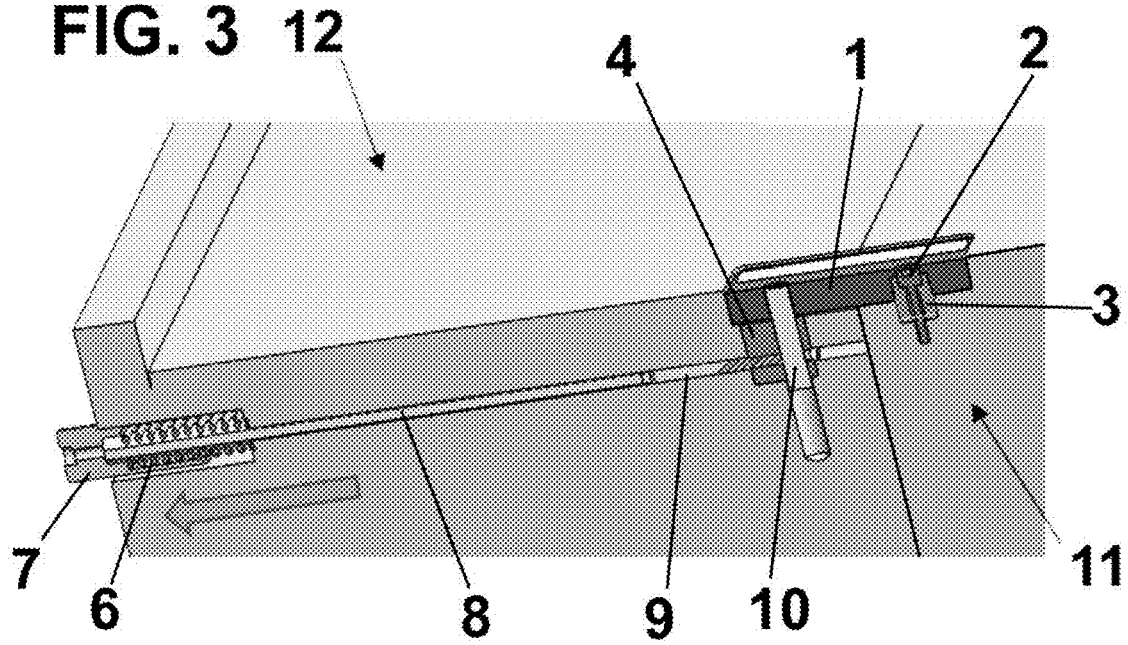
FIG. 3 is a perspective section view of an injection mold incorporating the safety device according to the present invention, the safety device being in the disassembled position, the mold not being mounted on an injection molding machine.
Figure 4:
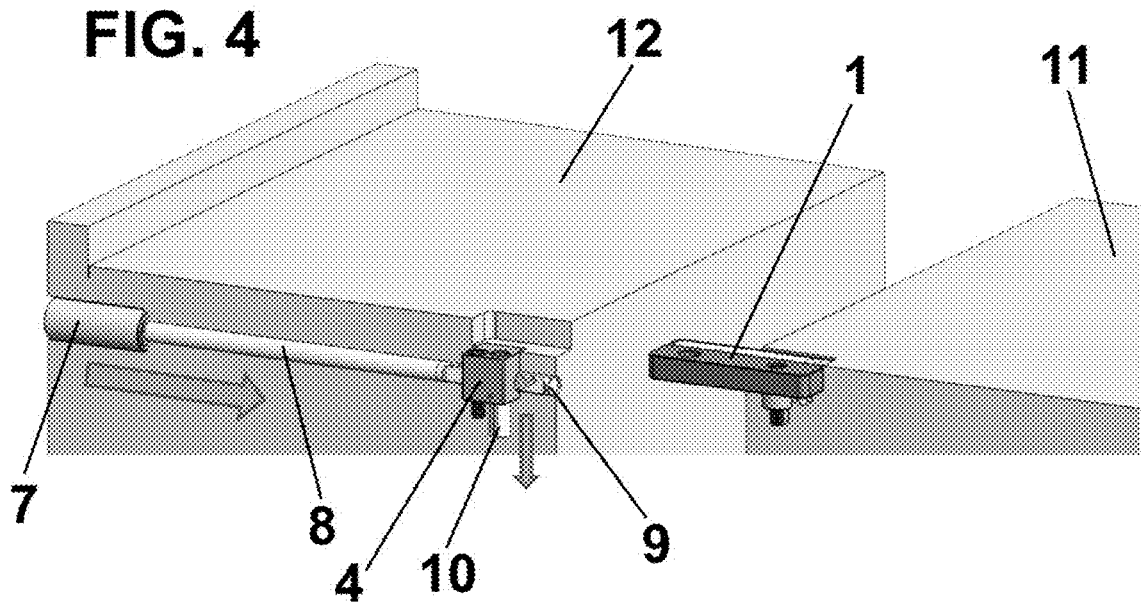
FIG. 4 is a perspective section view of an injection mold incorporating the safety device according to the present invention, the safety device being in its mounted position, the mold being mounted on an injection molding machine.

To make it easier to understand the movements of the drive shaft (9) and the safety shaft (10), these are indicated in FIGS. 3 and 4 by the corresponding arrows.

Although reference has been made to a specific embodiment of the invention, it is obvious to a person skilled in the art that the security device described is susceptible to numerous variations and modifications, and that all the details mentioned can be replaced by technically equivalent ones, without departing from the scope of protection defined by the appended claims.

The invention claimed is:

1. A safety device for an injection mold, the safety device comprising:
   a plate configured to attach to a first part of the injection mold, the plate comprising a hole;
   a base configured to attach to a second part of the injection mold, the base comprising a safety shaft movable relative to the base between a first position and a second position;

an actuator;

a drive shaft comprising a first end coupled to the base and a second end coupled to the actuator; and a spring disposed over the drive shaft and coupled to the actuator, wherein the safety device is configured so that when the plate and the base are attached to the first and second parts respectively, in a condition in which the injection mold is dismounted from an injection molding machine, the safety shaft automatically engages with the hole of the plate in the first position to hold the mold closed, and the safety device is configured so that when the injection mold is mounted to the injection molding machine, the actuator compresses the spring and causes the safety shaft to move to the second position thereby disengaging with the hole of the plate and allowing the mold to open.

2. The safety device according to claim 1, wherein said drive shaft comprises a rod.

3. The safety device according to claim 2, wherein the plate comprises a centering sleeve.

4. The safety device according to claim 1, wherein the drive shaft comprises teeth engaging with complementary teeth of the safety shaft.

5. The safety device according to claim 4, wherein the plate comprises a centering sleeve.

6. The safety device according to claim 1, wherein the plate comprises a centering sleeve.

7. The safety device according to claim 1, wherein a longitudinal axis of the drive shaft is orthogonal to a longitudinal axis of the safety shaft.

8. The safety device according to claim 1, wherein the plate is configured to fit within a recess of the first part of the injection mold.

* * * * *